United States Patent [19]
Rubright

[11] 3,753,549
[45] Aug. 21, 1973

[54] FLOW CONTROL DEVICE AND METHOD AND APPARATUS FOR MAKING SAME

[75] Inventor: Phillip L. Rubright, Berkley, Mich.

[73] Assignee: Arco Industries Corporation, Detroit, Mich.

[22] Filed: Dec. 11, 1972

[21] Appl. No.: 314,063

Related U.S. Application Data

[63] Continuation of Ser. No. 146,369, May 24, 1971, abandoned.

[52] U.S. Cl. ............... 251/305, 161/42, 161/149, 161/156
[51] Int. Cl. ............................................. F16k 1/22
[58] Field of Search ............... 251/298, 305, 306, 251/356, 173, 185; 264/250, 242, 255; 161/42, 149, 156

[56] References Cited
UNITED STATES PATENTS

| | | |
|---|---|---|
| 3,595,523 | 7/1971 | Felton .............................. 251/306 |
| 3,612,483 | 10/1971 | Pool ................................ 251/306 |
| 3,214,132 | 10/1965 | Goldthorpe ...................... 251/173 |
| 2,867,238 | 1/1959 | Wilfert ........................... 251/305 X |
| 3,398,222 | 8/1968 | Kaufman .......................... 264/250 |

Primary Examiner—Henry T. Klinksiek
Attorney—Gerald E. McGlynn, Jr., Owen E. Perry et al.

[57] ABSTRACT

A flow control device including a main body portion of rigid, plastic material, and a sealing portion of elastomeric material integrally bonded to the main body portion and projecting outwardly from the periphery thereof. Mounting means in the form of a pivot rod is molded to the main body portion for pivotally supporting the device in a duct or the like such that the peripheral elastomeric material is in resilient sealing engagement therewith. The integral bond between the elastomeric material and the main body portion is achieved by simultaneously finally curing the elastomeric material and the rigid plastic material while in contact within a mold.

22 Claims, 8 Drawing Figures

Patented Aug. 21, 1973

INVENTOR.
Phillip L. Rubright
BY
Barnard, McGlynn & Reising
ATTORNEYS

INVENTOR.
Phillip L. Rubright
BY
Barnard, McGlynn & Reising
ATTORNEYS

FLOW CONTROL DEVICE AND METHOD AND APPARATUS FOR MAKING SAME

This application is a continuation of Ser. No. 146,369 filed May 24, 1971, now abandoned.

This invention relates generally to flow control devices such as valves, dampers and the like for controlling flow through a duct or other flow passage, and is particularly concerned with a flow control device suitable for use in air conditioning, heating and ventilation systems of automobiles, and to a method and apparatus for manufacturing such flow control devices.

Flow control devices in the form of dampers or butterfly-type valves are particularly suitable for controlling the flow through automobile ventilation, air conditioning and heating ducts due to the ease and speed with which such devices can be manipulated. One of the problems with such devices is that of obtaining a good seal when the flow control device is in a closed position to shut off flow through a particular duct. This problem is of course magnified when the ducts and flow control devices must be produced on a mass production basis so that economical tolerances can be maintained for both the ducts and the flow control devices commensurate with the requirements for interchangablity of the parts. For large quantity production, it is of course also necessary to maintain production and material costs at a minimum.

A flow control device of this type must have a relatively rigid body portion to which mounting means such as a pivot rod or the like can be secured, and must have a peripheral resilient sealing portion for engagement with the inner walls of the duct being controlled by the flow control device. The conventional flow control device of this type includes a metal body with a resilient sealing member somehow attached to the periphery of the metal body, the metal body having a pivot rod or some other type of mounting means secured thereto for pivotally mounting the device in a duct or conduit. Such devices are expensive to manufacture since the metal parts must first be formed, cast, machined or the like, and then must have a resilient sealing member attached thereto.

Examples of prior art flow control devices of this type including some prior art methods of fabrication and manufacturing the same, are disclosed in U.S. Pat. Nos. 2,772,850; 2,983,478; 3,050,781; 3,111,300; 3,193,914; 3,272,904; and 3,447,222.

An object of this invention is to provide a flow control device for controlling fluid flow through a duct wherein the flow control device can be completely fabricated in a single mold.

A further object is to provide a flow control device having a relatively rigid main body portion of plastic such as a thermosetting resin, and a sealing portion of elastomeric material on the periphery of the main body portion.

A further object is to provide a flow control device having a relatively rigid main body portion of thermosetting resin, a sealing portion of elastomeric material, and a mounting rod embedded in the main body portion for pivotally supporting the device in a duct wherein all three components of the device can be molded and assembled together in a single mold.

A further object is to provide a method and apparatus for making, on a mass production basis, a flow control device having a relatively rigid main body portion with a resilient sealing portion and a mounting rod or the like embedded in the main body portion.

In carrying out the foregoing, and other objects, a flow control device according to the invention may include a main body portion of thermosetting epoxy resin to which is molded on the periphery thereof a sealing portion of elastomeric material. The sealing portion may be of vinyl plastisol.

The main body portion may have embedded therein a mounting rod for pivotally supporting the device in a duct. A central portion of the rod is embedded in the main body portion, and offset end portions on the rod both project from the same side of the device so that the pivotal mounting may be located on the downstream side of the device whereby in an automobile ventilation system, the pivotal mounting will be on the passenger compartment side of the device, or the side of the device where it is not critical to prevent leakage from the duct.

The flow control device may be molded in a molding apparatus having a first mold portion with a bottom surface for defining one side surface of the elastomeric sealing portion and an edge surface for defining the outer periphery of the sealing portion with a second mold portion surrounded by the first mold portion and having a bottom surface for defining one side surface of the main body portion. A removable mold member receivable in the second mold portion is formed with an edge surface to define the inner periphery of the sealing portion.

The removable mold member is heated to a temperature at or above the temperature to gel plastisol, and is then placed in the molding apparatus. Vinyl plastisol or the like in liquid state is then poured into the first mold portion which surrounds the hot mold member. The hot mold member causes the plastisol to gel on contact, and thus prevents the liquid plastisol from leaking around the removable mold member from the first mold portion to the second mold portion. The liquid plastisol is then partially cured to the extent that the vinyl plastisol becomes non-liquid throughout. The removable mold member is then removed from the assembly and liquid thermosetting epoxy resin is then poured into the second mold portion which is surrounded by the partially cured elastomer. A mounting rod is then placed on the mold with the central portion thereof immersed in the liquid epoxy resin. The mold and the entire contents are then placed in a curing oven or the like to simultaneously cure the epoxy resin and complete curing of the plastisol. The plastisol is thus bonded to the epoxy resin, and the mounting rod is embedded in the solidified epoxy resin.

Other objects, advantages and features of the invention will become apparent from the following description taken in connection with the accompanying drawings in which.

Figure 1:
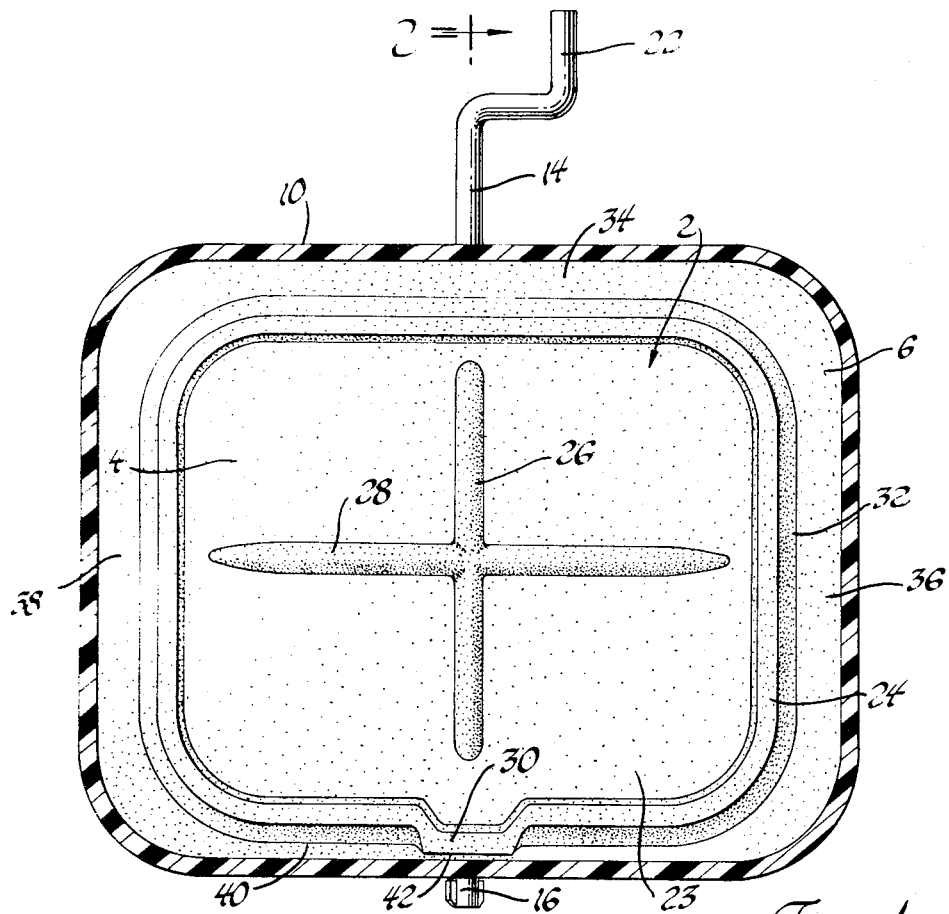
FIG. 1 is a cross-sectional view of a duct having a flow control device according to the invention mounted therein.
Figure 2:
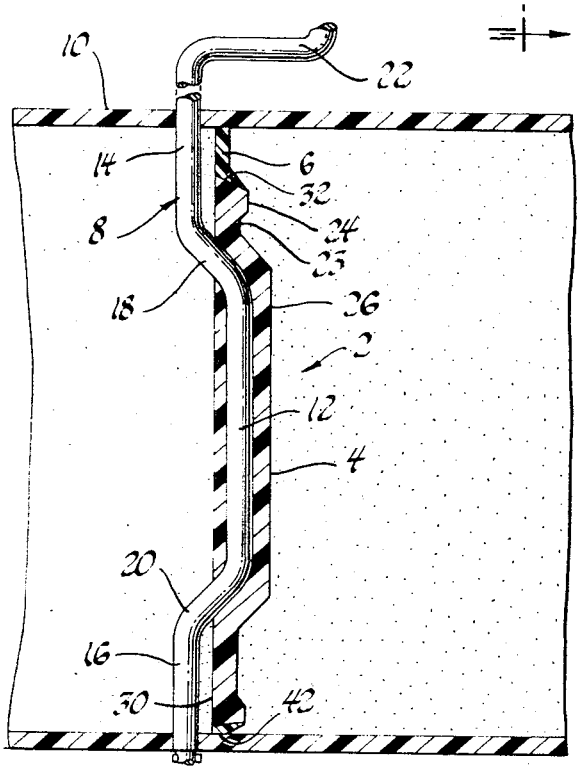
FIG. 2 is a sectional view taken on line 2—2 of FIG. 1.

With reference first to FIGS. 1 and 2, reference numeral 2 collectively designates a flow control device according to the invention having a main body portion 4 of rigid plastic material, and a sealing po/tion 6 of elastomeric material on the periphery of the main body portion 4. Mounting means 8 for pivotally mounting the flow control device 2 in a duct 10 comprises a rod molded to the main body portion 4.

The rod 8 has a central portion 12 embedded in the material of the body portion 4, and offset end portions 14 and 16 on the central portion both of which project from one side of the main body portion 4 and through openings in the wall of the duct 10 for pivotally mounting the flow control device 2 in the duct. The central portion 12 has outwardly bent portions 18 and 20 projecting from the main body portion 4, the end portions 14 and 16 extending respectively from the bent portions 18 and 20. A crank arm 22 is formed on the end portion 14 for connection with a cable or similar operating means.

The main body portion 4 of the control device 2 comprises a flat disc with a peripheral flange 24 projecting from one side thereof in the direction of the axis of duct 10. A central bead 26 projects from the same side 23 of the disc forming the main body 4, and the central portion 12 of the mounting rod 8 extends in parallel relationship with the bead 26. A bead 28 extending transversely of the bead 26 is also formed on the main body 4 and projects from side 23 thereof. A locating projection 30 is formed on the periphery of the disc or main body 4 for providing vertical support of the main body 4 in the duct 10. As illustrated by reference numeral 32, the edge surface of the disc or main body 4 is inclined outwardly and toward the left as viewed in FIG. 2, and the elastomeric sealing portion 6 is secured to the edge surface 32.

In the embodiment illustrated in FIGS. 1 and 2, the flow control device 2 is of non-circular configuration in plan, and the peripheral sealing portion 6 varies in width around the circumference of the main body 4. The top segment 34 and side segments 36 and 38 of the elastomeric sealing portion 6 are of substantially the same width, while the bottom segment 40 is of substantially less width than segments 34, 36 and 38. The segment 42 of the elastomeric portion adjacent the locating projection 30 is of substantially less width than segment 40. Vertical or axial support of the control device 2 is provided by the locating projection 30 so that the entire periphery of the sealing portion 6 is in good sealing engagement with the inner walls of the duct 10.

The openings in the duct 10 for the end portions 14 and 16 of the mounting rod 8 are on the downstream side of the control device 2 so that there is no likelihood of leakage through such openings on the upstream or high pressure side of the control device 2. The high pressure side is the right hand side of control device 2 in FIG. 2 of the drawings. The end portions 14 and 16 will generally be located on the passenger compartment side of the control device 2 where it is not critical to prevent leakage from the duct 10.

The thin portion 42 of the sealing portion 6 provides a seal beneath the locating projection 30 without a significant amount of deflection of the elastomeric portion 32 so that the upper segment 34 of the sealing portion 6 is in good sealing contact with the upper wall of the duct 10. The mounting rod 8 provides transverse support for the control device 2 such that the side segments 36 and 38 of the sealing portion 6 are in close sealing contact with the respective side walls of the duct. Consequently, when the control device 2 is in the fully closed position illustrated in FIGS. 1 and 2, there will be no flow through the duct past the control device 2.

Figure 3:
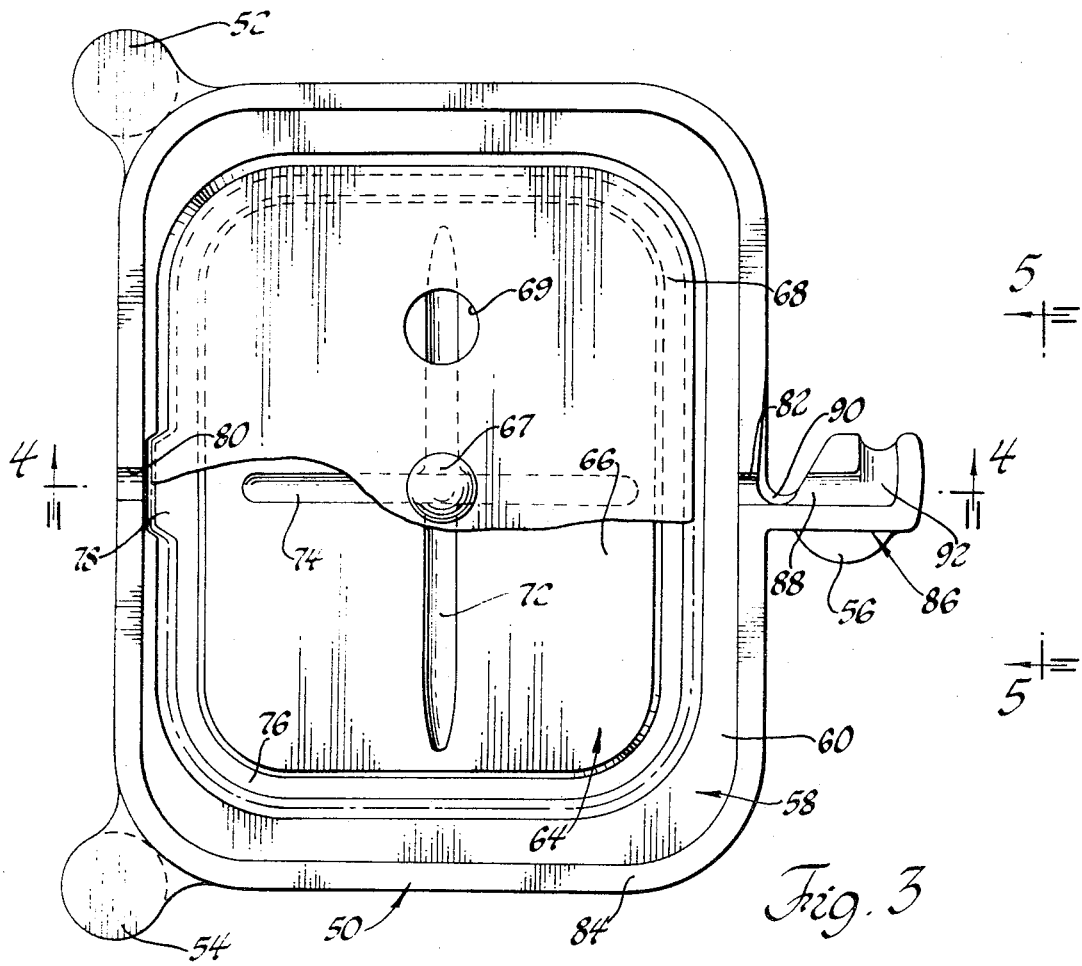
FIG. 3 is a plan view of molding apparatus for molding the flow control device shown in FIGS. 1 and 2.
Figure 4:
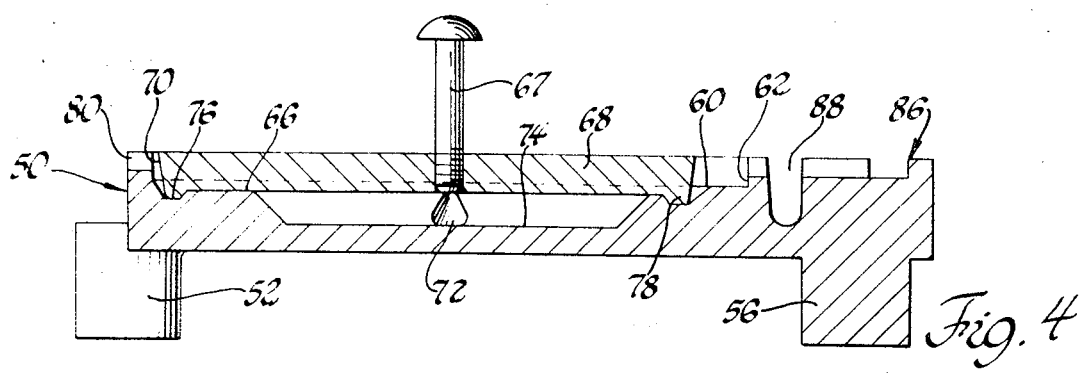
FIG. 4 is a sectional view taken on line 4—4 of FIG. 3.
Figure 5:
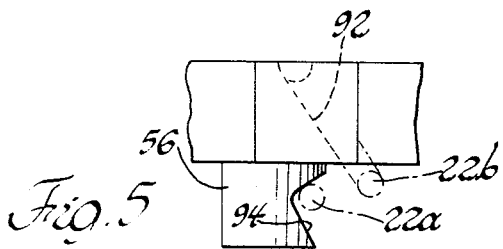
FIG. 5 is a view taken on line 5—5 of FIG. 3.

FIGS. 3, 4 and 5 illustrate molding apparatus for molding the control device 2. Reference numeral 50 collectively designates a mold body having legs 52, 54 and 56. A cavity is formed in the mold body 50 including a first mold portion 58 having a bottom surface 60 for defining one side surface of the sealing portion 6 of the control device 2 and an edge surface 62 for defining the outer periphery of the sealing portion 6. The mold cavity includes a second mold portion 64 surrounded by the first mold portion 58 and having a bottom surface 66 for defining one side surface of the main body portion 4 of the control device 2.

A removable mold member 68 is receivable in the second mold portion 64 and has an edge surface 70 for defining the inner periphery of the sealing portion 6. Transverse recesses 72 and 74 are formed in the bottom surface 66 of the second mold portion 64 for defining the beads 28 and 26, respectively, on the main body portion 4 of the control device 2. The mold portion 64 is also formed with a peripheral recess 76, and the mold member 68 has a corresponding flange 78 projecting from its lower side in FIG. 4 which is receivable in the recess 76.

The bottom surfaces of the first and second mold portions 58 and 64 are non-circular in plan, and the width of the bottom surface of the first mold portion 58 varies around the periphery of the second mold portion 64 in accordance with the configuration of the segments 34, 36, 38, 40 and 42 of the sealing portion 6 of the control device 2. The bottom surface 66 of the mold portion 64 projects outwardly as illustrated at 78 toward the edge surface of the mold portion 58 to define the locating projection of the control device 2.

Rod supporting means is formed on the mold apparatus of FIGS. 3, 4 and 5 and includes a pair of grooves 80 and 82 spaced from each other on opposite sides of the first and second mold portions, grooves 80 and 82 being formed in the rim 84 extending around the periphery of the mold body 50. The rod supporting means further includes a projection 86 extending outwardly from the rim 84 and having a rod receiving recess 88 formed therein which is in axial alignment with the grooves 80 and 82. The projection 86 includes a pair of crank arm locating slots 90 and 92 each communicating with the recess 82 for supporting the crank arm 22 of the mounting rod 8. The slot 90 is used to support a crank arm of one configuration, and the slot 92 is used to support a crank arm of a second configuration, as necessary. The slots 90 and 92 angularly locate the mounting rods with the mold cavity portions 58 and 64. As shown in FIG. 5, when the crank arm of the mounting rod is received in the slot 90, the crank arm comes to rest in a groove 94 formed in the support leg 56 to angularly locate the mounting rod. The mounting rod is indicated in phantom lines at 22a seated in the groove 94. when the slot 92 is used, the crank arm comes to rest in the slot in the location indicated approximately by the phantom lines 22b.

Threadedly mounted in the mold member 68 is a bolt 67 which serves as a handle for lifting the mold member 68 from its position seated in the groove 76 of the mold portion 64. Vent openings 69 are formed in the mold member 68 on opposite sides of the handle 67.

Figure 6:
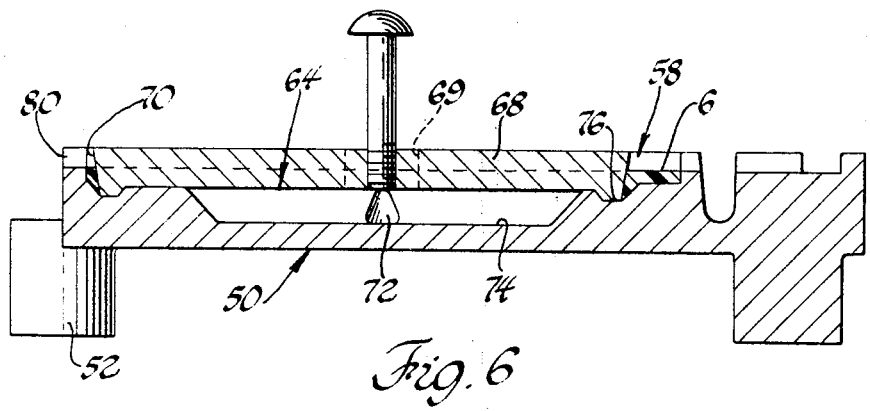
FIGS. 6, 7 and 8 are sectional views similar to FIG. 4 sequentially illustrating the steps in the manufacturing of the control device of FIGS. 1 and 2.
Figure 7:
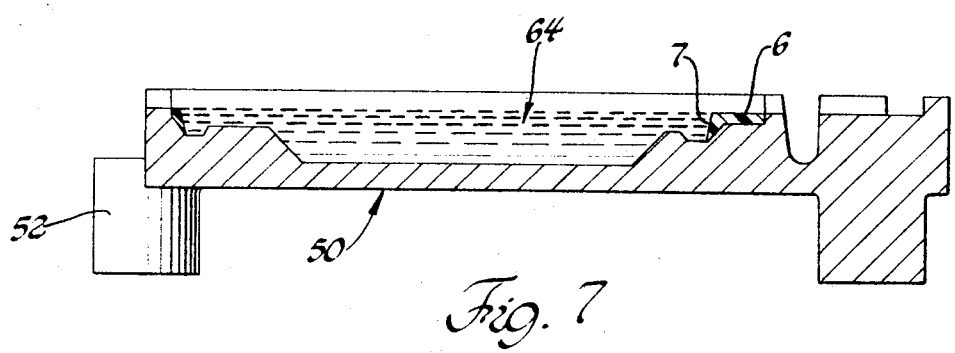
Figure 8:
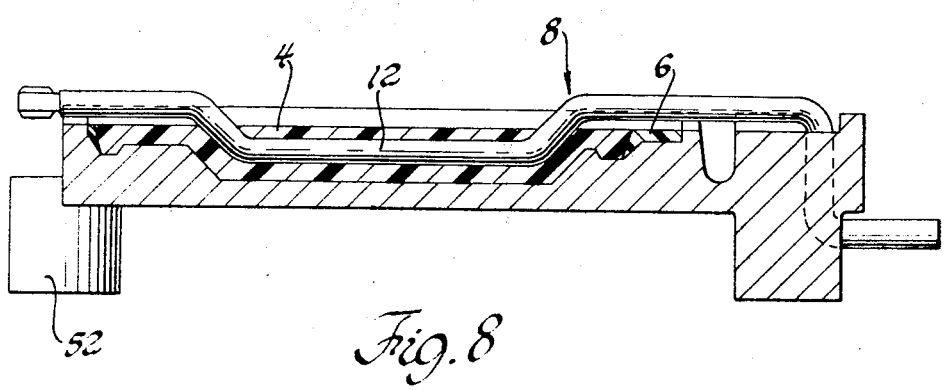

The manufacturing steps are illustrated in sequence in FIGS. 6, 7 and 8. In FIGS. 6, 7 and 8, the main body portion 4 is formed of thermosetting epoxy resin and the sealing portion 6 is formed of plastisol. By plastisol is meant a liquid dispersion of finely divided resin in a plasticizer. It is usually 100% solid with no volatiles, and when the volatile content exceeds 5% of the total weight, it is referred to as an organosol. When the plastisol is heated, the plasticizer solvates the resin particles, and the mass gels. With continued application of heat, the mass fuses to become a conventional thermoplastic material.

The removable mold member 68 is first heated to a temperature such that when plastisol comes into contact therewith, sufficient solvation will take place immediately to cause gelation of the plastisol in immediate contact therewith and thus prevent the liquid plastisol from leaking past the edge of the mold member 68. As illustrated in FIG. 6, with the heated mold member 68 mounted on the mold body 50 as shown, vinyl plastisol in liquid state is poured into the mold portion 58. When the liquid vinyl plastisol comes into contact with the hot mold member 68, the plastisol in immediate contact with the mold member 68 promptly gels to prevent leakage of the liquid plastisol around the mold member 68 into the mold portion 64.

The mold 50 along with the hot mold member 68 and the partially gelled liquid plastisol in the mold portion 58 is then further heated either in an oven or by infrared lights to partially cure the plastisol so that the vinyl plastisol becomes solid throughout in the configuration of the sealing portion 6. The removable mold member 68 is generally preheated to a temperature of about 250° which is a temperature substantially above the gelatin temperature of the vinyl plastisol material.

After the vinyl plastisol material 6 of FIG. 6 is partially cured to a solid or non-liquid state, the mold member 68 is removed from the mold body 50. The second mold portion 64 is then filled with liquid epoxy resin as illustrated in FIG. 7. The elevated temperature of the mold body 50 resulting from the partial curing stage of the vinyl plastisol assists in causing the liquid epoxy resin to flow freely into contact with the inner periphery 7 of the partially cured sealing member 6.

The mounting rod 8 is then placed on the mold with the central portion 12 thereof immersed in the liquid epoxy resin. The entire assembly of the mold, mounting rod, partially cured sealing portion 6, and liquid epoxy resin is then placed in a curing oven or the like until the epoxy resin is solidified and the curing of the vinyl plastisol is completed. The curing temperature of the vinyl and of the epoxy resin is matched so that the curing time is equal for both the sealing portion and the main body portion 4. When curing is complete, the central portion 12 of the mounting rod 8 is embedded in the solidified epoxy resin, and the sealing portion 6 is bonded integrally to the periphery of the main body portion 4. Silicon is baked onto the mold to prevent the epoxy resin from bonding to the mold.

Examples of suitable vinyl plastisol compositions in parts by weight are:

EXAMPLE I

| | |
|---|---|
| Copolymer vinyl resin | 100.0 |
| Vinyl stabilizer | 1.0 |
| CaO | 1.0 |
| Solvating depressant | 4.0 |
| Polymeric plasticizers | 60.0 |
| Monomeric plasticizers | 250.0 |
| Color | 1.0 |

EXAMPLE II

| | |
|---|---|
| Resin | 100.0 |
| Stabilizer | 2.0 |
| Plasticizer | 50.0 |
| CaO | 1.0 |
| Plasticizer | 60.0 |
| Wetting agent | 4.0 |
| Softener | 10.0 |
| Blowing agent | 2.5 |

EXAMPLE III

| | |
|---|---|
| Copolymer vinyl resin | 100.0 |
| Vinyl stabilizer | 1.0 |
| CaO | 1.0 |
| Solvating depressant | 4.0 |
| Polymeric plasticizers | 15-30 |
| Monomeric plasticizers | 75-115 |
| Diluent plasticizers | 5-15 |
| Color | 1.0 |
| Blowing | 1.0 |

While specific embodiments of the invention have been disclosed in the accompanying drawings and described in the foregoing specification, it should be understood that the invention is not limited to the exact construction shown. Alterations in the construction and arrangement of parts, all falling within the scope and spirit of the invention, will be apparent to those skilled in the art.

The embodiments of the invention in which an exclusive property or privilege is claimed are defined as follows:

1. A flow control device comprising: a main body portion of substantially rigid plastic material; and a sealing portion of elastomeric material bonded integrally to said main body portion and projecting outwardly from the periphery of said main body portion for resilient, sealing engagement with the wall of a duct or the like.

2. A device as claimed in claim 1 further including mounting means on said body portion for pivotably supporting the devices in a duct or the like.

3. A device as claimed in claim 2 wherein said mounting means comprises a rod molded to said body portion.

4. A device as claimed in claim 3 wherein said rod has a central portion embedded in the material of said body portion, and offset end protions on said central portion which project from one side of said body portion.

5. A device as claimed in claim 4 including a crank arm formed on one of said end portions.

6. A device as claimed in claim 1 wherein said body portion is composed of a thermosetting epoxy resin.

7. A device as claimed in claim 6 wherein said sealing portion is composed of vinyl plastisol.

8. A device as claimed in claim 1 wherein said sealing portion is composed of vinyl plastisol.

9. A device as claimed in claim 1 wherein said body portion comprises a flat disc with a peripheral flange projecting from one side thereof.

10. A device as claimed in claim 9 including a central bead projecting from said one side of said disc.

11. A device as claimed in claim 10 including a mounting rod having a central portion embedded in said central bead.

12. A device as claimed in claim 11 wherein said rod is formed with offset end portions extending from said central portion and projecting from one side of said disc.

13. A device as claimed in claim 12 including a locating projection formed on the periphery of said disc for providing vertical support of said disc in a duct or the like.

14. A flow control device comprising a main body portion of substantially rigid plastic material having a locating projection extending from the periphery thereof for providing transverse support of said main body portion in a duct or the like; and a sealing portion of elastomeric material bonded integrally to said main body portion and projecting outwardly from the periphery of said main body portion for resilient, sealing engagement with the walls of a duct or the like.

15. A device as claimed in claim 14 wherein said sealing portion has a reduced width at said locating projections.

16. A device as claimed in claim 15 further including mounting means on said body portion for pivotably supporting the device in a duct or the like.

17. A device as claimed in claim 16 wherein said mounting means comprises a rod molded to said body portion.

18. A device as claimed in claim 17 wherein said rod has a central portion embedded in the material of said body portion, and offset end portions on said central portion which project from one side of said body portion.

19. A device as claimed in claim 18 including a crank arm formed on one of said end portions.

20. A device as claimed in claim 19 wherein said body portion is composed of a thermosetting epoxy resin.

21. A device as claimed in claim 20 wherein said sealing portion is composed of vinyl plastisol.

22. A flow control assembly comprising: a duct; a flow control device controlling flow through said duct, said flow control device including a main body portion of substantially rigid plastic material with a locating projection extending from the periphery thereof for transversely supporting said device in said duct, a sealing portion of elastomeric material bonded integrally to said main body portion and projecting outwardly from the periphery of said main body portion and resiliently sealingly engaging the inner walls of said duct, and a mounting rod on said main body portion pivotably mounting said device in said duct; said mounting rod having a central portion embedded in said main body portion and a pair of oppositely extending offset end portions projecting from one side of said main body portion and pivotably supporting said flow control device in said duct; said locating projection extending from the periphery of said main body portion along the pivotal axis of said flow control device.

* * * * *